(12) United States Patent
Purusothaman

(10) Patent No.: US 9,729,411 B2
(45) Date of Patent: Aug. 8, 2017

(54) CENTRALIZED DEVICE MANAGEMENT SYSTEM FOR MONITORING AND CONTROLLING VARIOUS APPLICATION SPECIFIC NETWORK COMPONENTS ACROSS DATA CENTERS

(71) Applicant: Payoda Inc., Plano, TX (US)

(72) Inventor: Anand Purusothaman, Jersey, NJ (US)

( * ) Notice: Subject to any disclaimer, the term of this patent is extended or adjusted under 35 U.S.C. 154(b) by 222 days.

(21) Appl. No.: 14/556,552

(22) Filed: Dec. 1, 2014

(65) Prior Publication Data

US 2016/0156711 A1     Jun. 2, 2016

(51) Int. Cl.
| | | |
|---|---|---|
| *G06F 11/00* | (2006.01) | |
| *H04L 12/26* | (2006.01) | |
| *H04L 29/08* | (2006.01) | |
| *H04L 12/24* | (2006.01) | |

(52) U.S. Cl.
CPC .............. *H04L 43/04* (2013.01); *H04L 41/04* (2013.01); *H04L 41/0856* (2013.01); *H04L 41/0863* (2013.01); *H04L 41/12* (2013.01); *H04L 67/16* (2013.01); *H04L 43/0817* (2013.01); *H04L 43/10* (2013.01)

(58) Field of Classification Search
CPC ....... H04L 43/04; H04L 67/16; H04L 67/306; H04L 67/1095; H04L 67/1097; H04L 41/04; H04L 41/0856; H04L 41/0863; H04L 43/0817; H04L 43/10; H04L 41/12
USPC .......................................................... 714/6.1
See application file for complete search history.

(56) References Cited

U.S. PATENT DOCUMENTS

| | | | | |
|---|---|---|---|---|
| 2003/0200300 A1* | 10/2003 | Melchione | ................ | G06F 8/60 709/223 |
| 2012/0233668 A1* | 9/2012 | Leafe | .................... | G06F 9/5022 726/4 |
| 2013/0232240 A1* | 9/2013 | Purusothaman | ...... | H04L 43/045 709/220 |
| 2015/0127612 A1* | 5/2015 | Balcha | ................ | G06F 11/1451 707/645 |
| 2015/0326513 A1* | 11/2015 | Chiu | ....................... | H04L 51/22 726/7 |
| 2015/0350340 A1* | 12/2015 | Hellyar | ................... | H04L 67/16 709/223 |
| 2016/0239904 A1* | 8/2016 | Washington | ....... | G06Q 30/0635 |

* cited by examiner

*Primary Examiner* — Yair Leibovich
(74) *Attorney, Agent, or Firm* — The Law Office of Austin Bonderer, PC; Austin Bonderer

(57) ABSTRACT

A centralized device management system for monitoring and controlling a device on granular object level in a plurality of datacenters is provided. The system includes a memory unit, a display unit, and a processor. The memory unit stores a database and a set of modules. The processor executes the set of modules. The set of modules includes a discover module, and a backup and restore module. The discover module is configured to discover a device to the device to the centralized device management system. The backup and restore module includes a backup module, a compare module, and a restore module. The backup module is configured to create backups for a configuration of the device. The compare module is configured to compare the backed up configuration with existing configuration of the device. The restore module is configured to restore the backed up configuration of the device.

17 Claims, 14 Drawing Sheets

| | | | | | | | | | Admin | Logout |
|---|---|---|---|---|---|---|---|---|---|---|
| Dashboard | Device Management | | | | | | | | | |
| Ctrl Center | ADC ∨ | Add | Modify | Delete | Credential | Manage | Unmanage | Import | Config Fetch | |
| Device | Q Search... | | | | | | | | | |
| APS | Device Management | Group Name | | | | ⇅ | IP Address | ⇅ | Device Type | ⇅ | Datacenter | ⇅ |
| Config | Device Group | [P] dmz-ha-failover | | | | | 192.168.41.216 | | GTM | | Datacenter1 |
| Account | Software Upgrade | [A] dmz-ha-failover | | | | | 192.168.41.217 | | GTM | | Datacenter1 |
| Report | Backup & Restore | [M] dmz-data-sync | | | | | 192.168.41.218 | | GTM | | Datacenter2 |
| Alert | ☐ dc2perf5gtm24a... | | | | | | 192.168.41.219 | | GTM | | Datacenter1 |
| Security | ☐ dc2perf5gtm25a... | [M] dmz-ha-failover | | | | | 192.168.41.220 | | GTM | | Datacenter1 |
| | ☐ dc2perf5gtm26a... | | | | | | 192.168.41.221 | | GTM | | Datacenter2 |
| | ☐ dc2perf5ltm21a... | [M] dmz-data-sync | | | | | 192.168.41.222 | | LTM | | Datacenter2 |
| | ☐ dc2perf5ltm23a... | | | | | | 192.168.41.223 | | LTM | | Datacenter1 |
| | ☐ dc2perf5ltm24a... | | | | | | 192.168.41.224 | | LTM | | Datacenter1 |
| | ☐ dc2perf5ltm25a... | | | | | | 192.168.41.225 | | LTM | | Datacenter1 |
| | ☐ dc2perf5ltm26a... | | | | | | 192.168.41.226 | | LTM | | Datacenter1 |
| | | | | | | | | | | ≪ ⟨ 1 2 3 ⟩ ≫ |

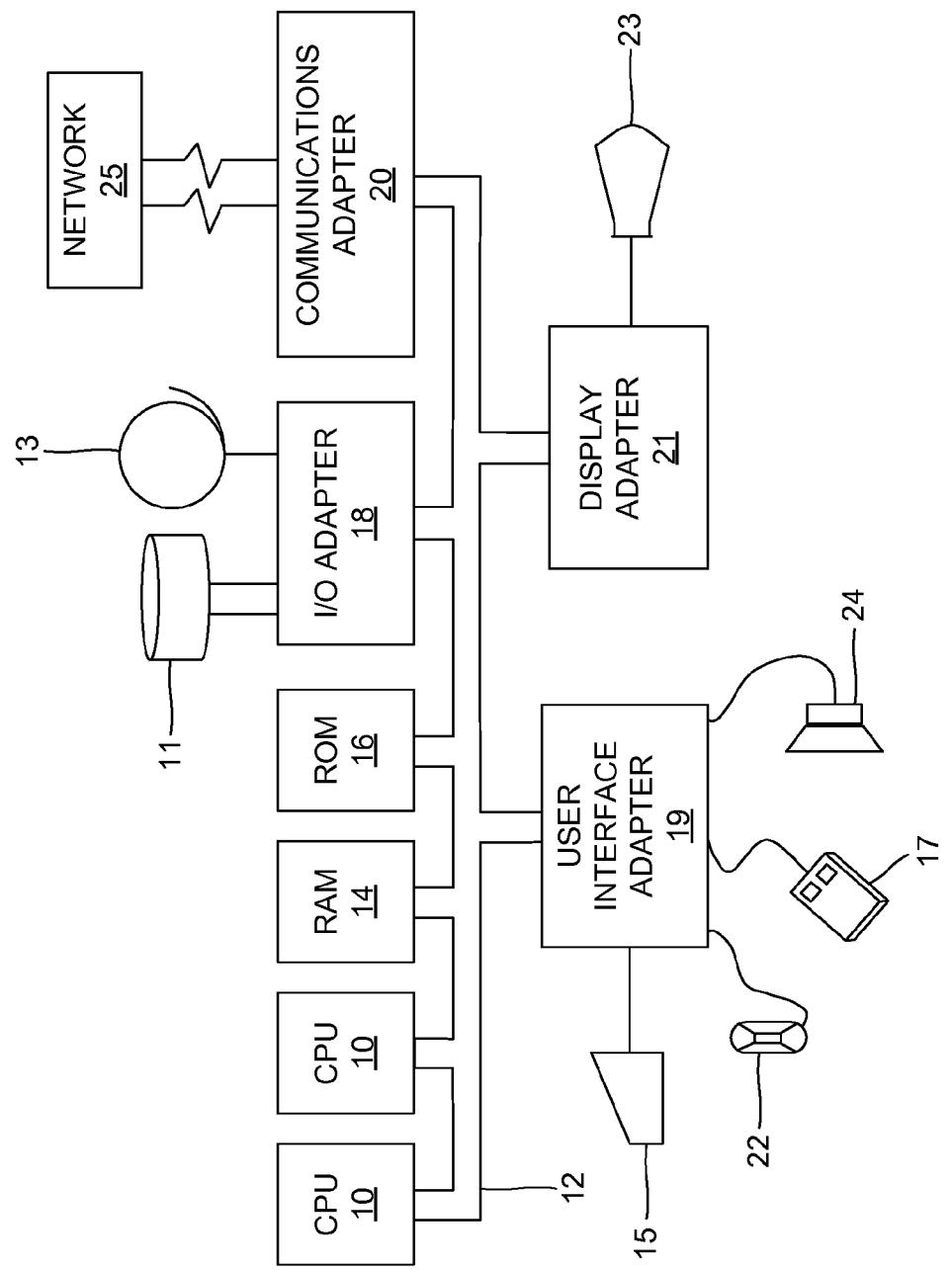

CENTRALIZED DEVICE MANAGEMENT SYSTEM FOR MONITORING AND CONTROLLING VARIOUS APPLICATION SPECIFIC NETWORK COMPONENTS ACROSS DATA CENTERS

BACKGROUND

Technical Field

The embodiments herein generally relate to a centralized device management system, and more particularly, to a system and method for monitoring, reporting, and controlling individual networking components (i.e. a device) on a consolidated platform across data centers.

Description of the Related Art

Application delivery and device management in networks are critical for application owners and network administrators. Existing legacy tools are not supported by development teams, as there are multiple different tools with each of them running on independent scripts. Collaboration among the tools is essential for the efficient functioning of a system. Existing applications are also independent of each another with access restricted to concerned independent teams. Thus, an unreasonable amount of time and resources are spent on writing scripts every time a team needs to monitor applications outside its scope of access. Also there is no single-view visibility of an application across networking components running across multiple data centers.

Device level operations on management tools makes routing traffic amongst data centers difficult and unnecessarily complex. This also amplifies the risk of errors and difficulties in setting up and altering rules to serve traffic. Monitoring applications, studying statistics and gauging the health of applications are highly complex in existing systems. An increased number of independent tools render migration/upgrading of network tools almost impossible. Also, fixing issues consumes time, which is very critical in industries like banking, healthcare, etc., where data management is critical.

The most common solutions for application delivery and device management are provided by device vendors themselves. However, these solutions monitor the devices and give a device-centric view of the network, which does not meet the requirements of application owners, network administrators, and CXOs to monitor network components.

Accordingly, there is a need for a centralized system to monitor, report, and control individual networking components (e.g., a device).

SUMMARY

In view of the foregoing, an embodiment herein provides a centralized device management system for monitoring and controlling a device on granular object level in a plurality of datacenters. The centralized device management system includes a memory unit, a display unit, and a processor. The memory unit stores a database and a set of modules. The processor executes the set of modules. The set of modules includes a discover module, and a backup and restore module. The discover module, executed by the processor, is configured to discover a device to add the device to the centralized device management system. The backup and restore module includes a backup module, a compare module, and a restore module. The backup module, executed by the processor, is configured to create backups for a configuration of the device. The compare module, executed by the processor, is configured to compare the backed up configuration with existing configuration of the device. The restore module, executed by the processor, is configured to restore the backed up configuration of the device. In one embodiment, the centralized device management system further includes an add module, a modify module, and a delete module. The add module, executed by the processor, is configured to add a device to the centralized device management system. The modify module, executed by the processor, is configured to modify details of the device in the centralized device management system. The delete module, executed by the processor, is configured to delete a device from the centralized device management system. In another embodiment, the centralized device management system further includes a credential module, executed by the processor, to create one or more templates of credentials to be used when the device is added or modified in the centralized device management system. In yet another embodiment, the centralized device management system further includes an import module, that is executed by the processor, import a .csv file to bulk upload one or more devices to the centralized device management system. In yet another embodiment, the centralized device management system further includes a manage module, and an unmanage module. The manage module, executed by the processor, is configured to enable the device from unmanaged state to managed state. The unmanage module, executed by the processor, is configured to disable the device from managed state to unmanaged state. In yet another embodiment, the centralized device management system further includes an enable module, and a disable module. The enable module, executed by the processor, is configured to enable the device. The disable module, executed by the processor, is configured to disable the device. In yet another embodiment, the centralized device management system further include a configfetch module that executed by the processor, that is configured to extract vendor device configuration. The centralized device management system may further include a Health check module, and a refresh module. The Health check module, executed by the processor, is configured to generate health monitor reports of the device for diagnosing threats. The refresh module, executed by the processor, is configured to update the device.

In another aspect, a system for monitoring and controlling a plurality of application specific network components on granular object level in a plurality of datacenters is provided. In one embodiment, the plurality of application specific network components includes a device. The system includes a memory unit, a display unit, and a processor. The memory unit stores a database and a set of modules. The processor executes the set of modules. The set of modules includes a discover module, a backup and restore module, a credential module, and a configfetch module. The discover module, executed by the processor, is configured to discover a device to add the device to the system. The backup and restore module includes a backup module, a compare module, and a restore module. The backup module, executed by the processor, is configured to create backups for a configuration of the device. The compare module, executed by the processor, is configured to compare the backed up configuration with existing configuration of the device. The restore module, executed by the processor, is configured to restore the backed up configuration of the device. The credential module, executed by the processor, creates one or more templates of credentials to be used when the device is added or modified in the system. The configfetch module, executed by the processor, is configured to extract vendor device configuration. In one embodiment, the system further includes an add module, a modify module, and a delete module. The add module, executed by the processor, is configured to add a device to the system. The modify module, executed by the processor, is configured to modify details of the device in the system. The delete module, executed by the processor, is configured to delete a device from the system. In another embodiment, the system further includes an import module, executed by the processor, to import a .csv file to bulk upload one or more devices to the system. In yet another embodiment, the system further includes a manage module, and an unmanage module. The manage module, executed by the processor, is configured to enable the device from unmanaged state to managed state. The unmanage module, executed by the processor, is configured to disable the device from managed state to unmanaged state. In yet another embodiment, the system further includes an enable module, and a disable module. The enable module, executed by the processor, is configured to enable the device. The disable module, executed by the processor, is configured to disable the device. In yet another embodiment, the system further includes a Health check module, and a refresh module. The Health check module, executed by the processor, is configured to generate health monitor reports of the device for diagnosing threats. The refresh module, executed by the processor, is configured to update the device.

In yet another aspect, a computer implemented method for monitoring and controlling a device on granular object level in a plurality of datacenters using a centralized device management system is provided. The method includes followings steps: (i) discovering a device to add the device to the centralized device management system; (ii) backing up a configuration of the device; (iii) comparing the backed up configuration with existing configuration of the device; (iv) restoring the backed up configuration of the device; (v) managing the device to enable from unmanaged state to managed state; and (vi) unmanaging the device to disable to unmanaged state from managed state. In one embodiment, the method further includes the following steps: (i) adding a device to the centralized device management system; (ii) modifying details of the device; and (iii) deleting a device from the device management system. In another embodiment, the method further includes the following steps: (i) creating one or more templates of credentials to be used when the device is added or modified in the centralized device management system; (ii) importing a .csv file to bulk upload one or more devices to the centralized device management system; and (iii) generating health monitor reports of the device for diagnosing threats.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a user interface view of the centralized device management system of FIG. 1 according to an embodiment herein;

FIGS. 4A and 4B illustrate user interface views of the add tab of FIG. 3 according to an embodiment herein;

FIG. 5 illustrates a user interface view of the import tab of FIG. 3 according to an embodiment herein;

FIG. 6 illustrates a user interface view of an export tab according to an embodiment herein;

FIG. 7B illustrates a user interface view of the backup group field of FIG. 7A according to an embodiment herein;

FIG. 7D illustrates a user interface view of the restore tab of FIG. 7A according to an embodiment herein;

FIG. 10 illustrates a schematic diagram of a computer architecture used according to an embodiment herein.

DETAILED DESCRIPTION OF PREFERRED EMBODIMENTS

Figure 1:
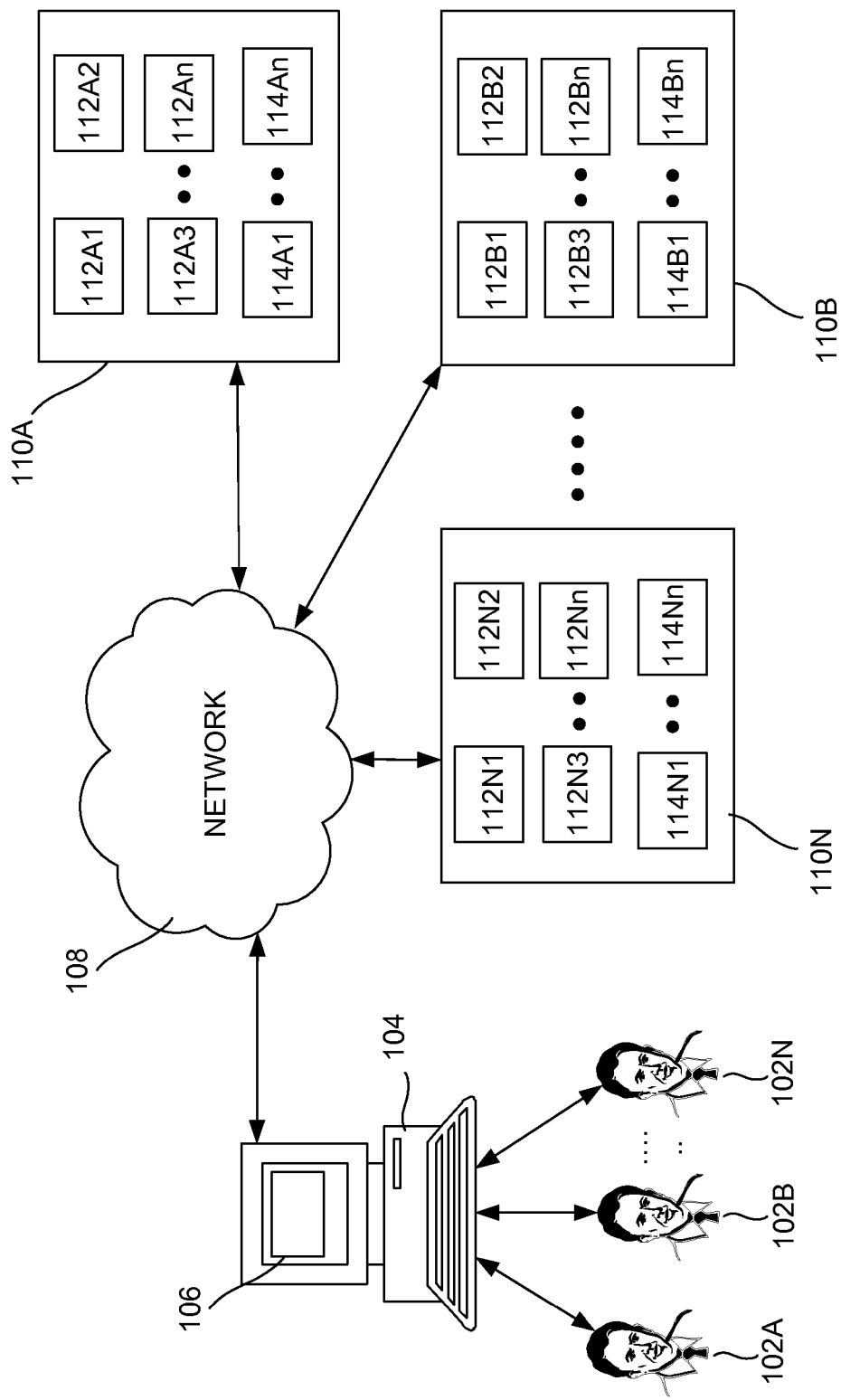
FIG. 1 illustrates a system view of one or more user communicating with a user system to monitor a network component using a centralized device management system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 10, where similar reference characters denote corresponding features consistently throughout the figures, there are shown preferred embodiments.

FIG. 1 illustrates a system view 100 of one or more user's 102A-N communicating with a user system 104 to monitor one or more Application Specific Networking Components (ASNC) 112A1-Nn (e.g., devices) operating in one or more datacenters 110A-N using a centralized device management system 106 according to an embodiment herein. The centralized device management system 106 provides a user interface to the one or more user's 102A-N to manage the one or more devices 112A1-Nn operating in the one or more datacenters 110A-N. In one embodiment, the one or more devices 112A1-Nn includes a BIG IP device from F5 networks, ACE—Application Control Engine from Cisco, and Netscaler from Citrix etc. The one or more datacenters 110A-N includes one or more IP servers 114A1-Nn. In one embodiment, the one or more IP server's 114A1-Nn is called as a domain server.

Figure 2:
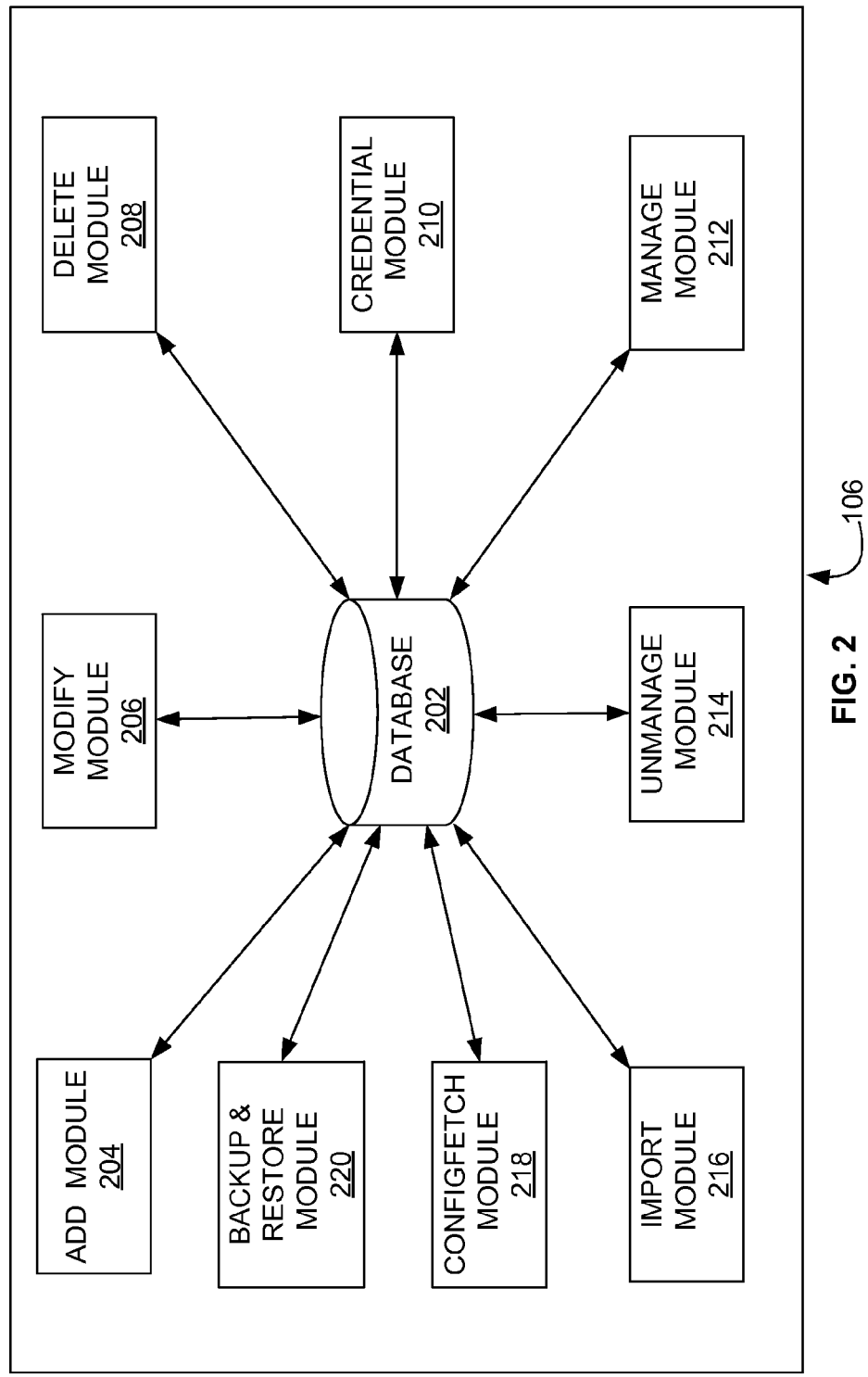
FIG. 2 illustrates an exploded view of the centralized device management system of FIG. 1 according to an embodiment herein.

FIG. 2 illustrates an exploded view of the centralized device management system 106 of FIG. 1 according to an embodiment herein. The centralized device management system 106 includes a database 202, an add module 204, a modify module 206, a delete module 208, a credential module 210, a manage module 212, an unmanage module 214, an import module 216, a configfetch module 218, and a backup and restore module 220. The add module 204 is configured to add a device on granular object level to the centralized device management system 106. The modify module 206 is configured to modify details of the device on granular object level in the centralized device management system 106. The delete module 208 is configured to delete a device on granular object level from the centralized device management system 106. The credential module 210 is configured to create one or more templates of credentials to be used when the device added or modified on granular object level in the centralized device management system 106. The manage module 212 is configured to enable the device to from unmanaged to managed state. The unmanage module 214 is configured to disable the device to be from managed to unmanaged state. The import module 216 is configured to import a .csv file to upload bulk devices to the centralized device management system 106. The configfetch module 218 is configured to extract vendor device configuration of the device. The backup and restore module 220 is configured to create backups for a configuration of the device on granular object level either manually or automatically.

In one embodiment, the centralized device management system 106 includes a discover module, an enable module, a disable module, a health check module, and a refresh module. The discover module is configured to discover a device to add the devices to the centralized device management system 106 on granular object level. The enable module is configured to enable a device in the centralized device management system 106. The disable module is configured to disable a device in the centralized device management system 106. The Health check module is configured to generate health monitor reports for diagnosing threats. The refresh module is configured to update the centralized device management system 106. In one embodiment, the granular object level includes an object attributes for authorized functions, and/or access control for individual object property of the device.

FIG. 3 illustrates a user interface view 300 of the centralized device management system 106 of FIG. 1 according to an embodiment herein. The user interface view 300 of the centralized device management system 106 includes an add tab 304, a modify tab 306, a delete tab 308, a credential tab 310, an import tab 312, a backup & restore tab 314, a configfetch tab 316, a manage tab 318, and an unmanage tab 320. The add tab 304 is clicked to add a new device on granular object level to the centralized device management system 106. The modify tab 306 is clicked to modify a configuration of the device on granular object level. The delete tab 308 is clicked to delete a selected device on granular object level from the centralized device management system 106. The credential tab 310 is clicked to create one or more templates of credentials on granular object level when the device is added or modified in the centralized device management system 106. The import tab 312 is clicked to import a .csv file to upload bulk devices to the centralized device management system 106. The backup & restore tab 314 is clicked to create backups for a configuration of the device. The configfetch tab 316 is clicked to extract vendor device configuration of the device. The manage tab 318 is clicked to enable the device to from unmanaged to managed state. The unmanage tab 320 is clicked to disable the device to be from managed to unmanaged state.

In one embodiment, the user interface view 300 of the centralized device management system 106 includes a discover tab, an enable tab, a disable tab, a health tab, and a refresh tab. The discover tab is clicked to discover a range of devices on granular object level, and add the devices to the centralized device management system 106. The enable tab is clicked to enable the device from unmanaged to managed state. The disable tab is clicked to disable the device from managed to unmanaged state. The health tab is clicked to generate technical snapshot of the device for diagnosing threats in the centralized device management system 106. The refresh tab is clicked to update the centralized device management system 106.

In another embodiment, the credential tab 310 provides an option for defining preconfigured template of device authentication credentials. In one embodiment, credentials are defined/created on granular object level while adding a device, or discovering and adding a range of devices available in a network. The credential tab 310 includes a credential name field, an access type field, a SNMP field, and an API. The credential name field displays the credential template name. The access type field provides the access profile (SNMP or API). The SNMP field provides an option to enter the community string and SNMP Version. The API field provides an option to enter a username and a password. The credential tab 310 consolidates multiple devices access requirement with single access which can be created/updated when password is changed.

In another embodiment, the discover tab includes a range mode tab and a subnet mode tab. The range mode tab provides an option to search a set of devices in a network with a start and ending range of IP address and add the set of devices in bulk to monitor with the centralized device management system 106. The range mode tab includes a start IP field, an end IP field, an access type field, a community string field, and an available device field. The start IP field provides the starting device IP range to search from. The end IP field provides the ending device IP range to search to. The access type field provides the SNMP version. The community string field provides the community string after choosing the SNMP version. The available device field displays a list of discovered devices with respective details which is added to the centralized device management system 106 to manage and monitor. The subnet mode tab is configured to search a set of devices in the network with a start and an IP address falling under the subnet allowed range and add the set of devices in bulk to monitor with the centralized device management system 106.

In one embodiment, the health tab generates a Health monitor report. The health monitor report provides a running snapshot of the device with up-to-the-minute configuration and diagnostic information. The health tab includes a diagnostic report tab, and a setting tab. The diagnostic report tab displays the Health monitor report as archives which are generated as per the settings by date and time. In one embodiment, the diagnostic report tab displays the corresponding diagnostic reports. The diagnostic report tab includes a select archive, and a detailed grid. The select archive field displays the health monitor report based on date and time of generation of the health monitor report. The detailed grid field generates and displays the diagnostic report of each health monitor report in the grid. The detailed grid field includes a search bar field, a title field, a description field, and a more details field. The search bar field allows keyword search of the report. The title field displays the title of the report. The description field displays the short description of the report. The more details field provides a detailed report of the selected report. The setting tab enables or disables health monitor report generation with further actions.

Figure 4A:
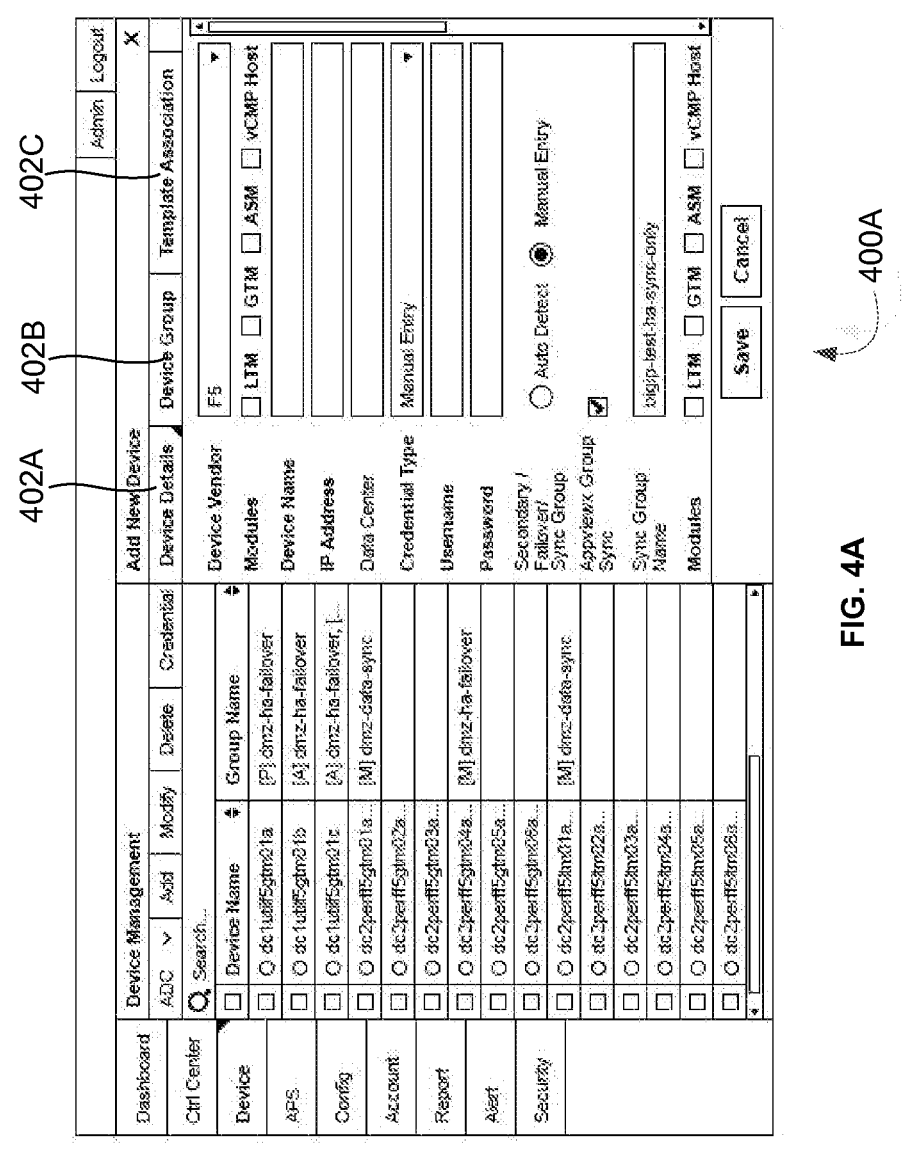
Figure 4B:
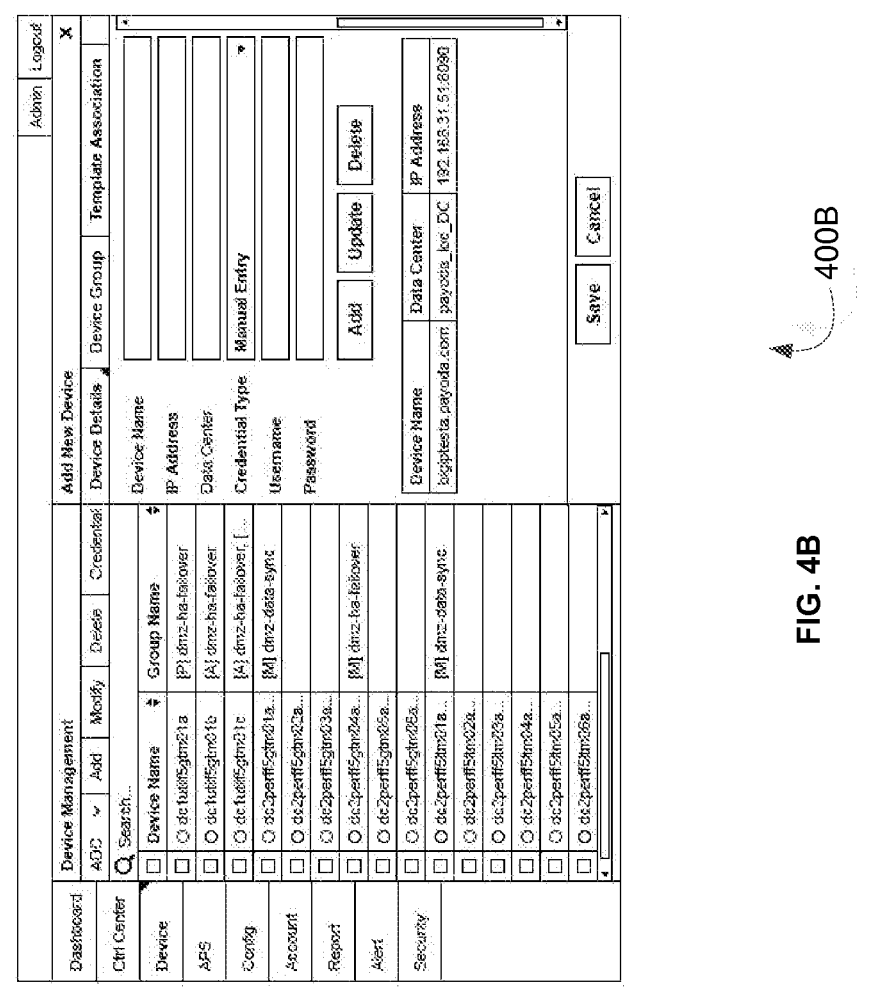

FIGS. 4A and 4B illustrate user interface views 400A-B of the add tab 304 of FIG. 3 according to an embodiment herein. The user interface views 400A-B include a device details tab 402A, a device group tab 402B, and a template association tab 402C. The device details tab 402A provides an option to add a new device of network on granular object level to be monitored using the centralized device management system 106. The device details tab 402A includes a device vendor field, a modules field, a device name field, a data center field, IP address field, and a credential type field. The device vendor field selects a device vendor. The modules field configures the modules of the device vendor to be accessed. The device name field provides the name of the device in a network.

The data center field selects data center to which the network device is associated. The IP address field provides an IP address of the primary device to which the connection will be established. The credential type field displays the mode of connection to the primary device (for e.g., (a) manual entry (connection to the device is established by collecting the credential each time the device is accessed), (b) user credentials (connection to the device is established with preconfigured details) and (c) credential list (connection to the device is established with the preconfigured details based on the credential template already created)).

In one embodiment, the device group tab 402B allows a device to be added with a predefined group. Adding a device to the group helps managing devices under group to set threshold, configuration backup & restore and a health monitor report generation using device group tab 402B. The user interface view of device group tab 402B includes a group name field, and description field of the group. The group name field provides a list of group names. The description field provides description of the group name field.

In one embodiment, the template association tab 402C associates a device with a predefined configuration template of the centralized device management system 106. In another embodiment, the template association tab 402C includes a configuration template field. A template configuration is done in the configuration template field. A new configuration is created based on templates associated to the device. The template association tab 402C further schedules configuration push to the device based on template usage to manage configuration change control effectively.

Figure 5:
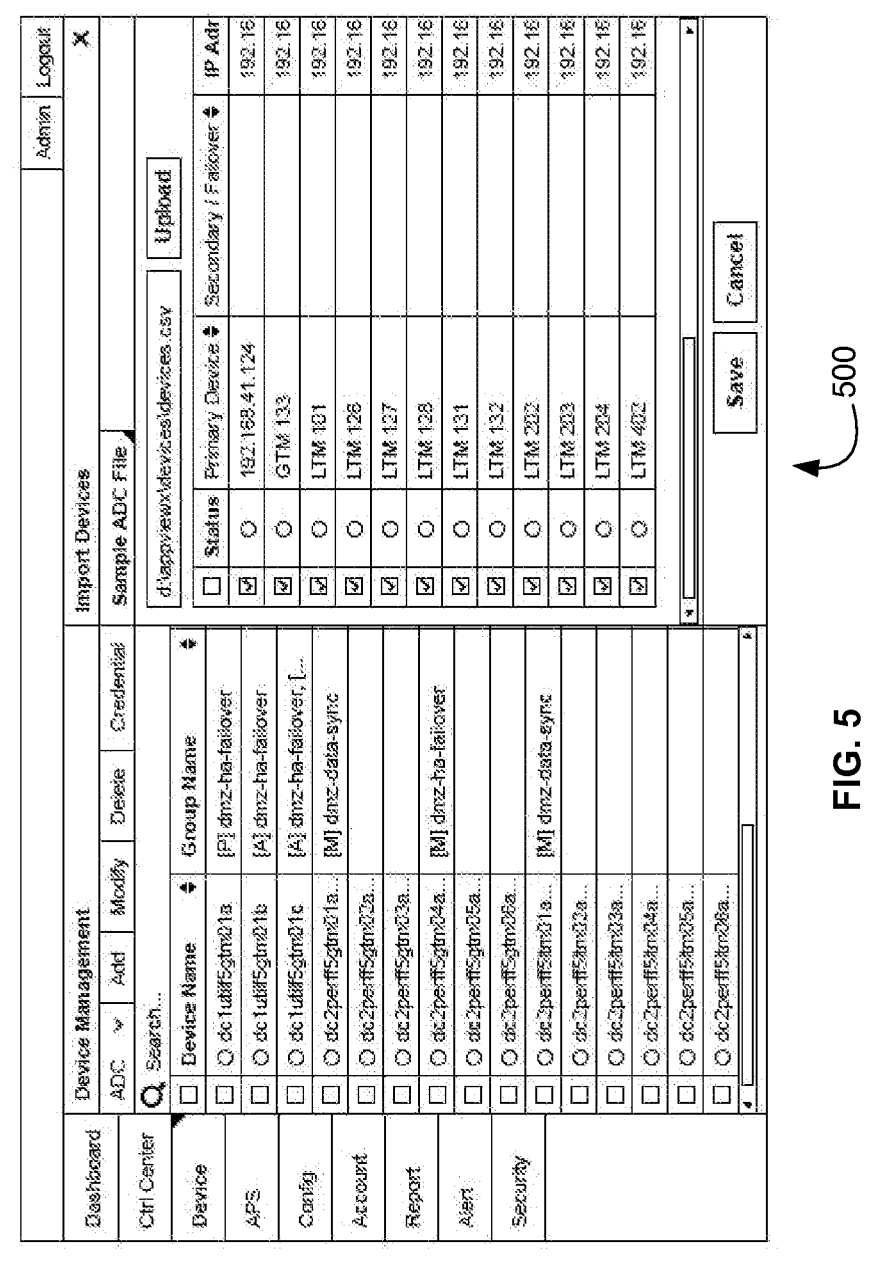

FIG. 5 illustrates a user interface view 500 of the import tab 312 of FIG. 3 according to an embodiment herein. The import tab 312 provides an option to add a group of devices available in the network in bulk using the .CSV file upload to the application on granular object level. In one embodiment, the import tab 312 downloads a sample file, and enters the details of the devices to be added, and then click upload to upload the .csv file to the centralized device management system to display the devices that are available to be imported. The user interface view 500 validates the details of the device, and imports a selected device. The interface view 500 displays a status of the selected device whether the selected device is successfully imported or not.

Figure 6:
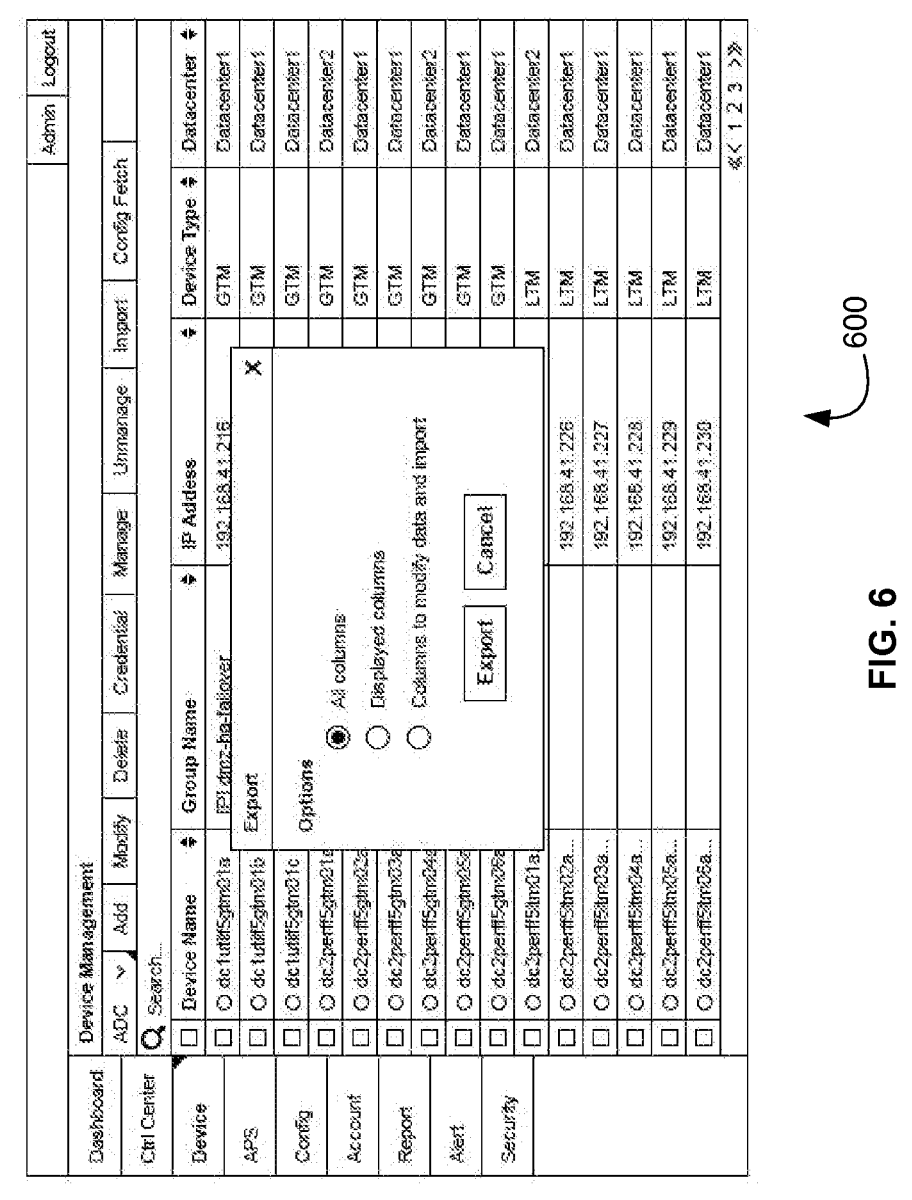

FIG. 6 illustrates a user interface view 600 of the export tab (not shown in FIG. 3) according to an embodiment herein. The export tab exports details of the device into an excel sheet on granular object level. In one embodiment, the export tab exports one or more columns, and/or fields of the device. In another embodiment, the export tab exports a specific column of the device. In another embodiment, the export tab exports and/or modifies selected fields of the device.

Figure 7A:
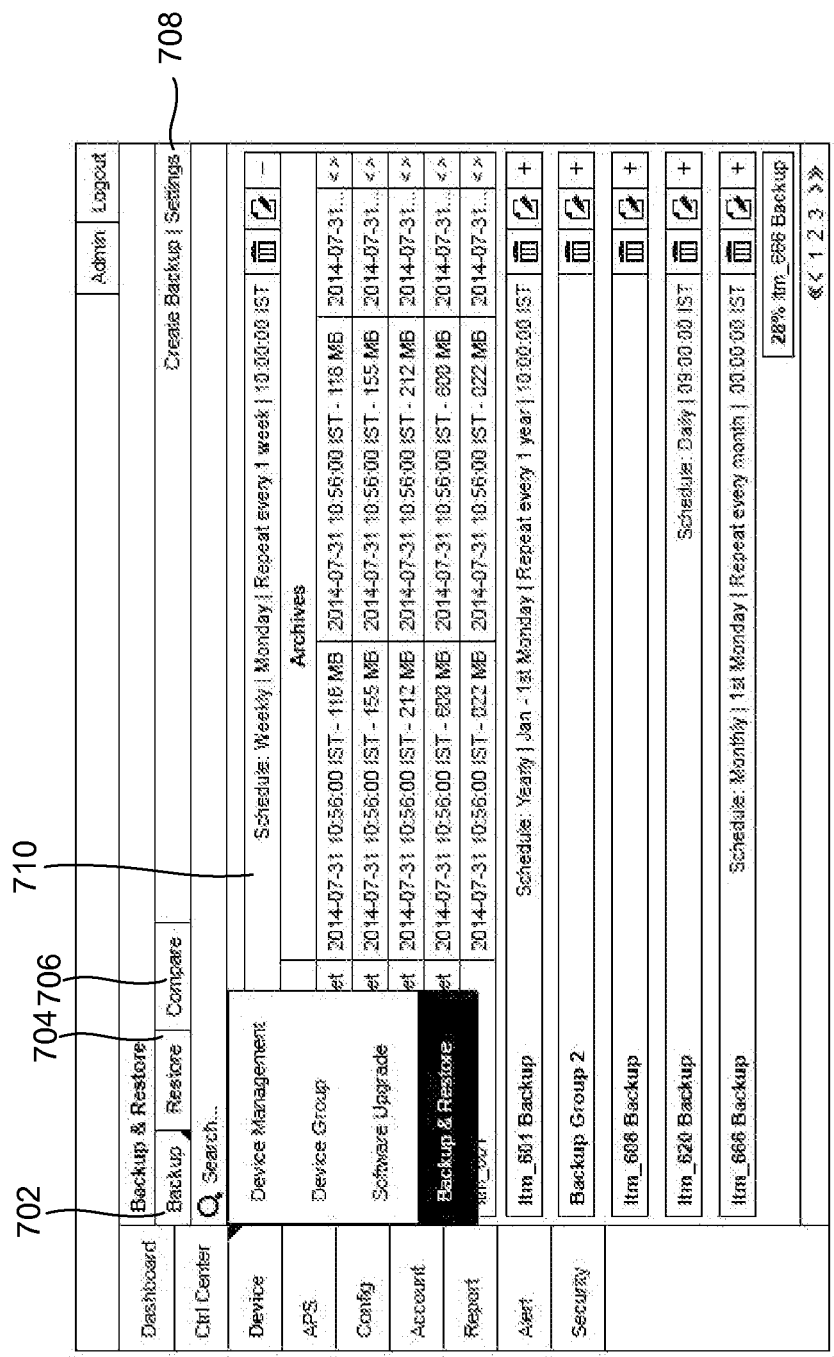
FIG. 7A illustrates a user interface view of the backup & restore tab of FIG. 3 according to an embodiment herein.

FIG. 7A illustrates a user interface view 700A of the backup & restore tab 314 of FIG. 3 according to an embodiment herein. The user interface view 700A includes a backup tab 702, a restore tab 704, a compare tab 706 and a setting tab 708. The backup tab 702 displays the backup configuration available for a device on granular object level which is archived as per the backup settings. The backup tab 702 includes a backup group field 710 that includes a device name field, and an archive field. The backup tab 702 schedules a process of creating a backup copy of configuration settings of the device. The backed up configuration is stored in an object dictionary. While backing up a configuration using the backup tab 702, the changes happened on an object are backed up, and stored in the object dictionary as a changed version of the object. The backed up configuration is restored on granular object level from the archived configurations when required. In one embodiment, the one or more user's 102A-N configures to store N number of changes as opposed to N number of backups with the same configuration in the object dictionary. While restoring the object, the one or more user's 102A-N selects the last changed object to restore the configuration as opposed to device level restore. In one embodiment, the object dictionary stores object dependency, so that, the one or more user's 102A-N selects and restores all the objects that are dependent while restoring the object. The setting tab 708 manages settings for backup and restores module 220.

Figure 7B:
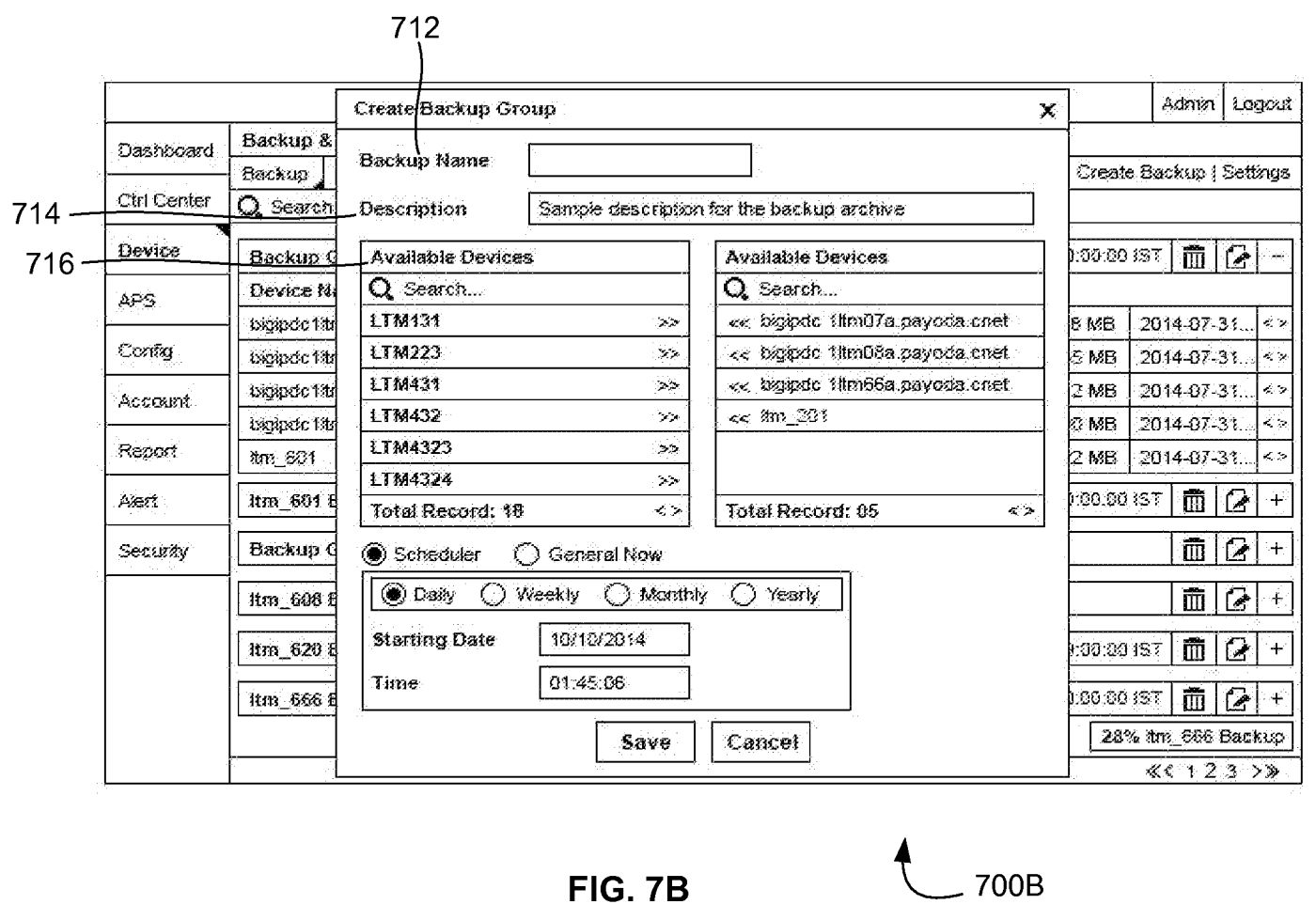

FIG. 7B illustrates a user interface view 700B of the backup group field 710 of FIG. 7A according to an embodiment herein. The backup group field 710 includes a backup name field 712, a description field 714, and an available device field 716. The backup name field 712 provides a name for a backup. The description field 714 includes details of the backup. The available device field 716 shows a list of available devices to create a backup. In one embodiment, the backup is scheduled (for e.g., the backup is taken (i) daily, (ii) weekly, (iii) monthly, and/or (iv) yearly)

Figure 7C:
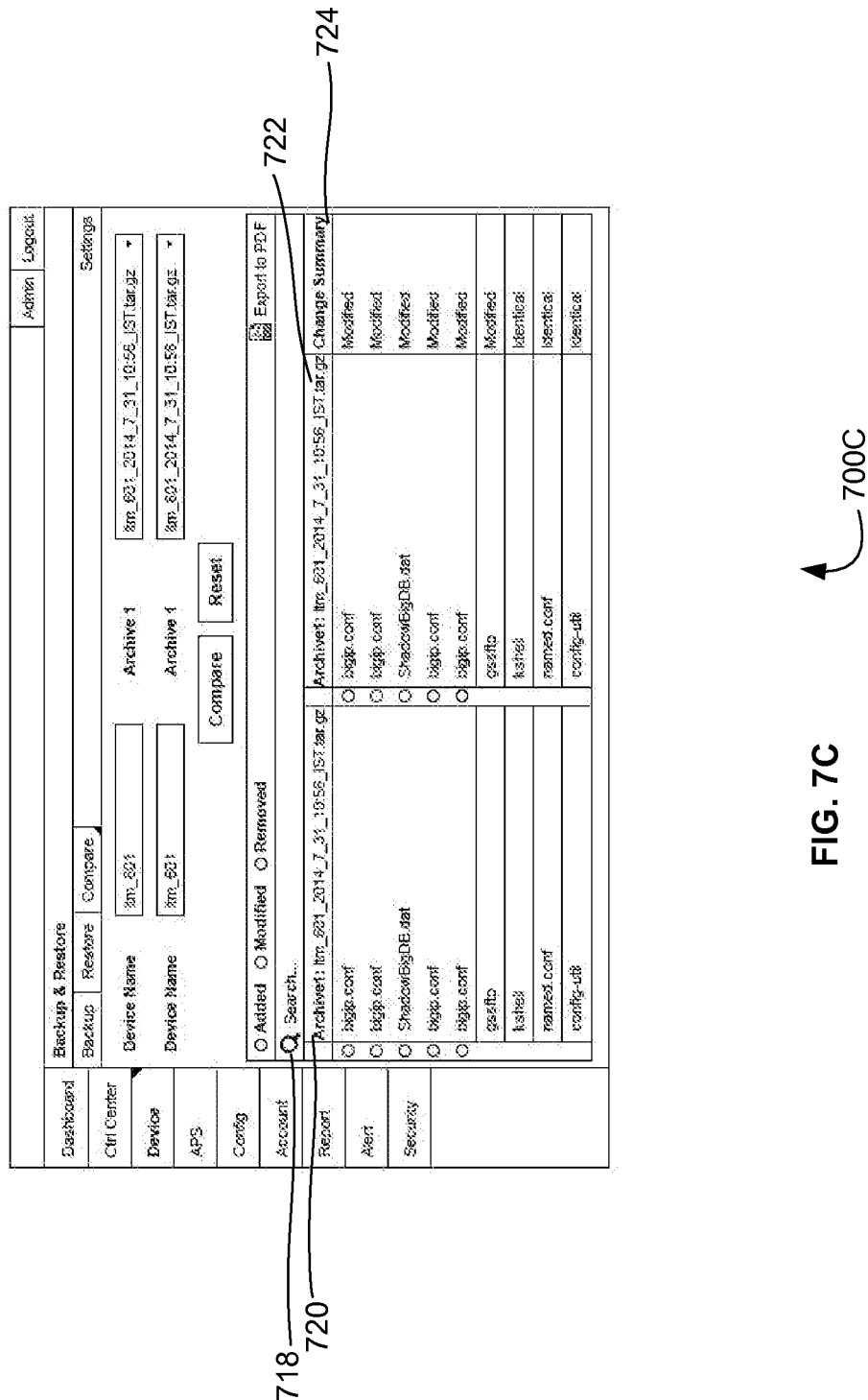
FIG. 7C illustrates a user interface view of the compare tab of FIG. 7A according to an embodiment herein.

FIG. 7C illustrates a user interface view 700C of the compare tab 706 of FIG. 7A according to an embodiment herein. The compare tab 706 compares file level comparison of any two selected archives on granular object level. In one embodiment, the archives are one or more configurations of a device. The user interface 700C includes a search bar field 718, a first archive field 720, a second archive field 722, and a change summary field 724. The search bar field 718 provides an option for keyword search of any of the archive. The first archive field 720 selects (a) a first archive to be compared, and (b) the files associated with the first archive. The second archive field 722 selects (a) a second archive to be compared with the first archive, and (b) the files associated with the second archive. The change summary field 724 displays a status whether the compared archives/files are identical or modified.

Figure 7D:
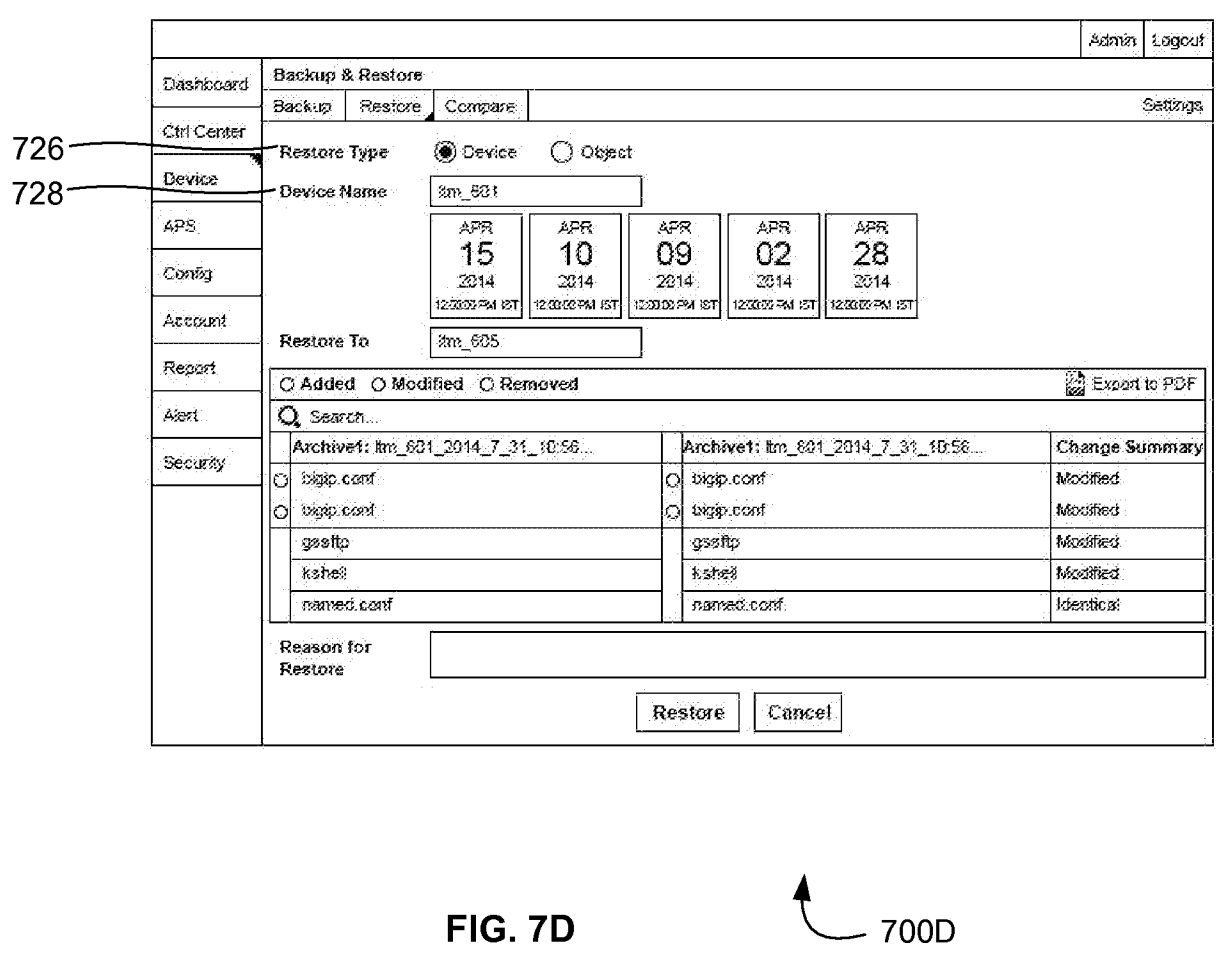

FIG. 7D illustrates a user interface view 700D of the restore tab 704 of FIG. 7A according to an embodiment herein. The user interface view 700D includes a restore type field 726, and a device name field 728. In one embodiment, the restore type field 726 includes (i) a device restore, and/or (ii) an object restore. In another embodiment, the restore tab 704 includes a device name field 728 that provides an option for keyword search to find any particular object.

Figure 8:
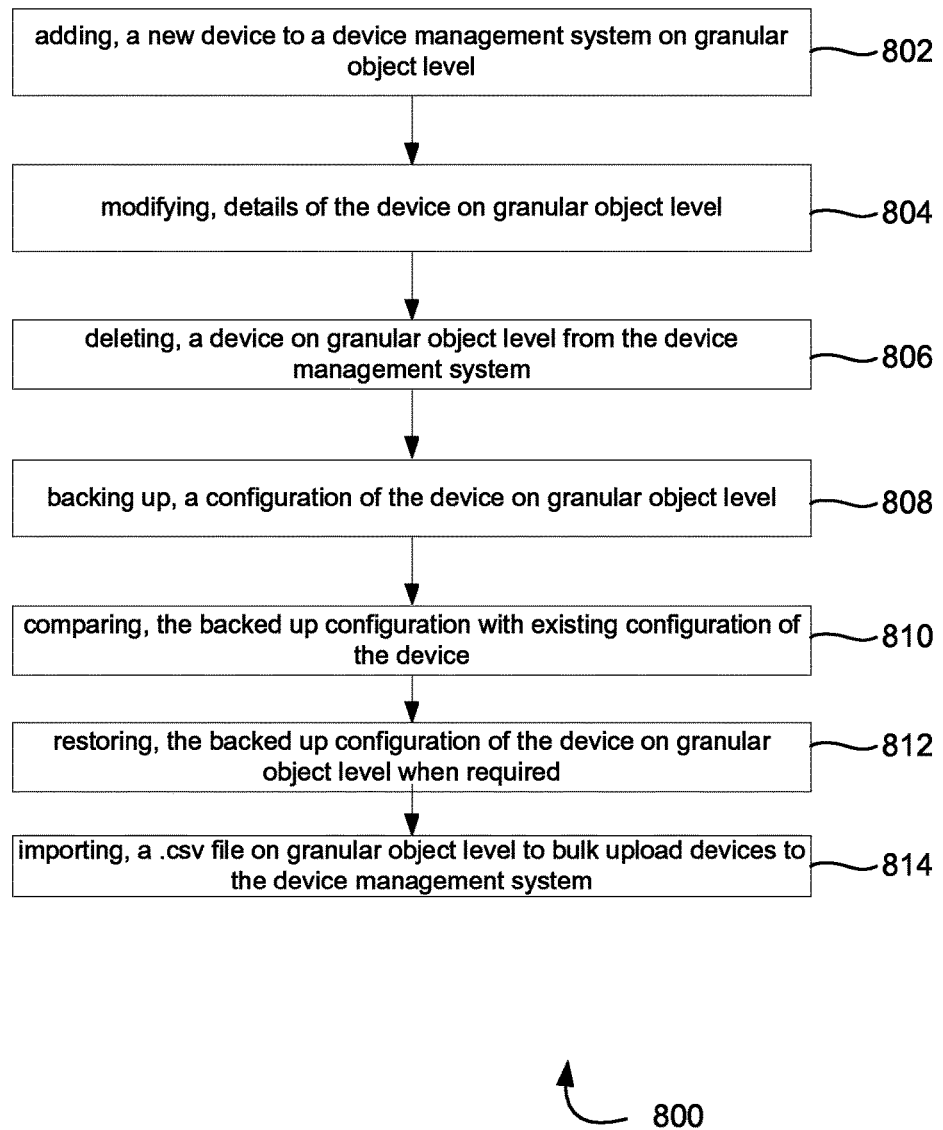
FIG. 8 is a flow diagram illustrating a computer implemented method for monitoring and controlling of a plurality of application specific networking components in a plurality of datacenters using centralized device management system of FIG. 1 according to an embodiment herein.

FIG. 8 is a flow diagram illustrating a computer implemented method for monitoring and controlling of a plurality of application specific networking components (e.g., a device) in a plurality of datacenters using the centralized device management system of FIG. 1 according to an embodiment herein. In step 802, a new device is added to a centralized device management system on granular object level. In step 804, one or more details of the device are modified on granular object level. In step 806, a device is deleted on granular object level from the centralized device management system. In step 808, a configuration of the device is backed up either manually or automatically on granular object level. In step 810, the backed up configuration of the device is compared with existing configuration of the device. In step 812, the backed up configuration of the device is restored on granular object level when required. In step 814, a .csv file is imported on granular object level to bulk upload one or more devices to the centralized device management system. In one embodiment, the method includes the step of enabling/disabling the device on granular object level. In another embodiment, the method further includes the step of refreshing the device to update on granular object level.

In yet another embodiment, the method may include the step of discovering a device to add the device on granular object level to the centralized device management system. In yet another embodiment, the method may include the step of (a) enabling the device from unmanaged state to managed state, and/or (b) disabling the device to unmanaged state from managed state.

Figure 9:
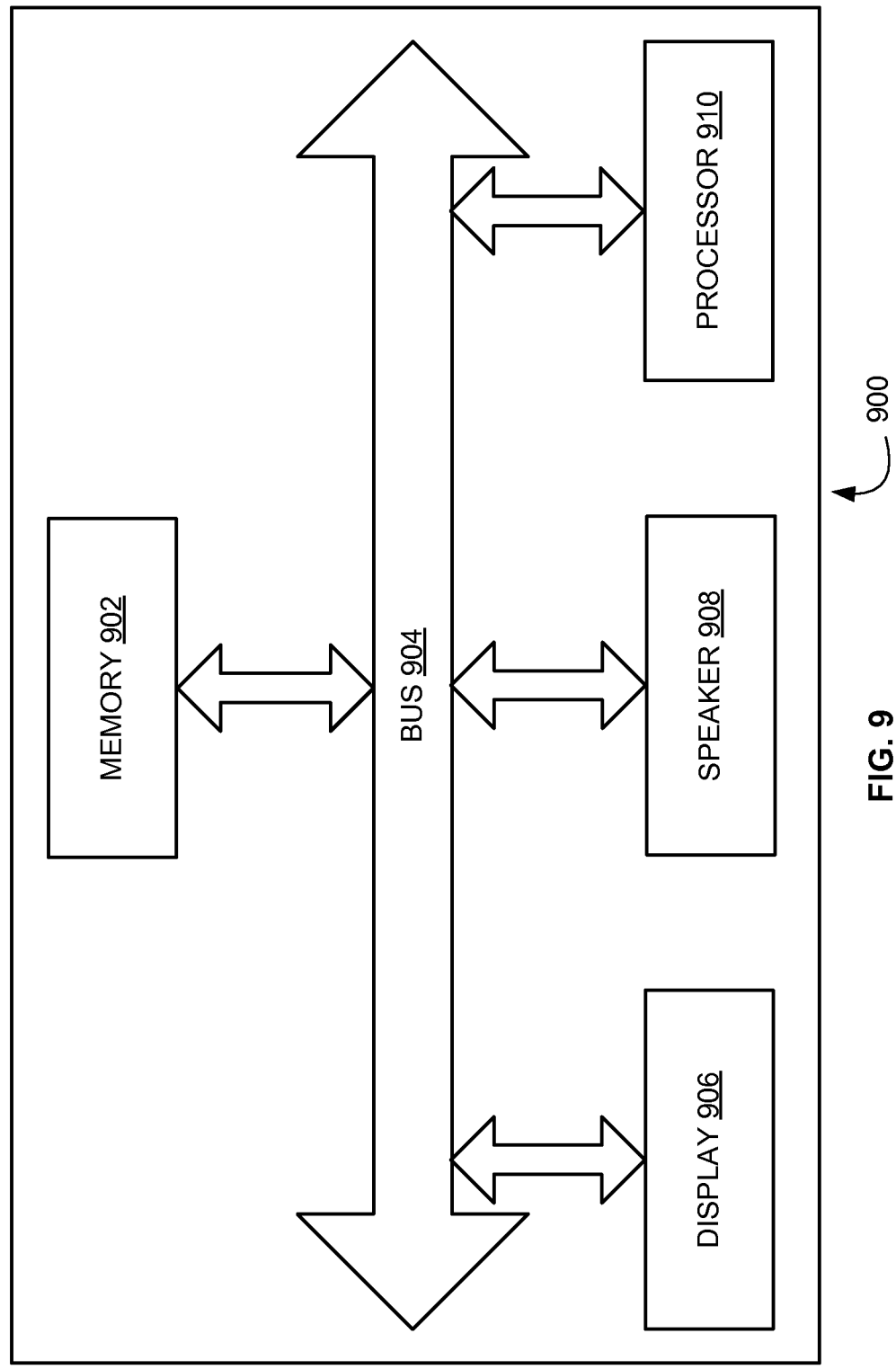
FIG. 9 illustrates an exploded view of the receiver of FIG. 1 according to an embodiment herein.

FIG. 9 illustrates an exploded view of the receiver 900 of FIG. 1 having an a memory 902 having a set of instructions, a bus 904, a display 906, a speaker 908, and a processor 910 capable of processing the set of instructions to perform any one or more of the methodologies herein, according to an embodiment herein. The processor 910 may also enable digital content to be consumed in the form of video for output via one or more displays 906 or audio for output via speaker and/or earphones 908. The processor 910 may also carry out the methods described herein and in accordance with the embodiments herein.

Digital content may also be stored in the memory 902 for future processing or consumption. The memory 902 may also store program specific information and/or service information (PSI/SI), including information about digital content (e.g., the detected information bits) available in the future or stored from the past. A user of the receiver 900 may view this stored information on display 406 and select an item of for viewing, listening, or other uses via input, which may take the form of keypad, scroll, or other input device(s) or combinations thereof. When digital content is selected, the processor 910 may pass information. The content and PSI/SI may be passed among functions within the receiver using the bus 904.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or compuler readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A centralized device management system for monitoring and controlling a device on granular object level in a plurality of datacenters, said centralized device management system comprising:
    a memory that stores a database;
    a display; and
    a processor that is configured to
        discover a device to add said device to said centralized device management system; and
        import a .csv file to bulk upload one or more devices to said centralized device management system;
            create a backup for a configuration of said device, wherein one or more changes occurred on the configuration of said device is backed up, and stored in the database as a changed version of the configuration of said device;
            compare said backed up configuration with existing configuration of said device;
            restore said backed up configuration of said device;
            manage said device to enable from unmanaged state to managed state; and
            unmanage said device to disable to said unmanaged state from said managed state.

2. The system of claim 1, wherein said processor further configured to
    add a device to said centralized device management system;
    modify details of said device in said centralized device management system; and
    delete a device from said centralized device management system.

3. The system of claim 1, wherein said processor further configured to
    create one or more templates of credentials to be used when said device is added or modified in said centralized device management system.

4. The system of claim 1, wherein said processor further configured to
    generate a health monitor report, wherein said health monitor report provides a running snapshot of said device with up-to-the-minute configuration and diagnostic information;
    display said health monitor report as archives which are generated as per settings by date and time; and
    generate and display said diagnostic report of said health monitor report in a grid.

5. The system of claim 1, wherein said processor further configured to
    enable said device; and
    disable said device.

6. The system of claim 1, wherein said processor further configured to
    extract vendor device configuration.

7. The system of claim 1, wherein said processor further configured to
    generate health monitor reports of said device for diagnosing threats; and
    update said device.

8. A system for monitoring and controlling a plurality of application specific network components on granular object level in a plurality of datacenters, wherein said plurality of application specific network components comprises a device, said system comprising:
    a memory that stores a database;
    a display; and
    a processor that is configured to
        discover a device to add said device to said system;
        import a .csv file to bulk upload one or more devices to said system;
            create backups for a configuration of said device, wherein one or more changes occurred on the configuration of said device is backed up, and stored in the database as a changed version of the configuration of said device;
            compare said backed up configuration with existing configuration of said device;
            restore said backed up configuration of said device;
            manage said device to enable from unmanaged state to managed state;
            unmanage said device to disable to said unmanaged state from said managed state;
            create one or more templates of credentials to be used when said device is added or modified in said system; and
            extract vendor device configuration.

9. The system of claim 8, wherein said processor further configured to generate a health monitor report, wherein said health monitor report provides a running snapshot of said device with up-to-the-minute configuration and diagnostic information;

display said health monitor report as archives which are generated as per settings by date and time; and generate and display said diagnostic report of said health monitor report in a grid.

10. The system of claim 8, wherein said processor further configured to enable said device; and disable said device.

11. The system of claim 8, wherein said processor further configured to generate health monitor reports of said device for diagnosing threats; and update said device.

12. The system of claim 8, wherein said processor further configured to add a device on granular object level to said system;

modify details of said device in said system; and delete a device from said system.

13. A computer implemented method for monitoring and controlling a device on granular object level in a plurality of datacenters using a centralized device management system, wherein said method comprises:

discovering, said device to add said device to said centralized device management system;

importing, a .csv file to bulk upload one or more devices to said centralized device management system;

backing up, a configuration of said device, wherein one or more changes occurred on the configuration of said device is backed up, and stored in a database as a changed version of the configuration of said device;

comparing, said backed up configuration with existing configuration of said device;

restoring, said backed up configuration of said device;

managing, said device to enable from unmanaged state to managed state; and unmanaging, said device to disable to said unmanaged state from said managed state.

14. The method of claim 13, further comprising:

adding, a device to said centralized device management system;

modifying, details of said device; and deleting, a device from said centralized device management system.

15. The method of claim 13, further comprising:

creating one or more templates of credentials to be used when said device is added or modified in said centralized device management system.

16. The method of claim 13, further comprising:

generating, a health monitor report, wherein said health monitor report provides a running snapshot of said device with up-to-the-minute configuration and diagnostic information;

displaying, said health monitor report as archives which are generated as per settings by date and time; and generate and display said diagnostic report of said health monitor report in a grid.

17. The method of claim 13, further comprising:

generating health monitor reports of said device for diagnosing threats.

* * * * *